United States Patent
Martinez et al.

(10) Patent No.: US 6,487,464 B1
(45) Date of Patent: Nov. 26, 2002

(54) POWER-ON SOFTWARE FOR ROBUST BOOT

(75) Inventors: Jesus A. Martinez, Portland, OR (US); Manoj B. Agnihotri, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/513,424

(22) Filed: Feb. 25, 2000

(51) Int. Cl.[7] .................................................. G05B 9/02
(52) U.S. Cl. ................................. 700/79; 700/2; 700/5; 700/21; 700/23; 700/81; 700/82; 713/1; 713/2; 713/100; 710/10; 710/104; 714/32; 714/36
(58) Field of Search .......................... 700/2–5, 21, 22, 700/23, 79, 78, 80, 81, 82; 713/1, 2, 100; 710/10, 104; 714/36, 32

(56) References Cited

U.S. PATENT DOCUMENTS

| | | | | |
|---|---|---|---|---|
| 4,590,554 A | * | 5/1986 | Glazer et al. | 428/663 |
| 4,999,838 A | * | 3/1991 | Horikawa | 714/2 |
| 5,138,708 A | * | 8/1992 | Vosbury | 714/11 |
| 5,375,227 A | * | 12/1994 | Akatsu et al. | 711/113 |
| 5,448,716 A | * | 9/1995 | Hardell et al. | 709/400 |
| 5,734,831 A | * | 3/1998 | Sanders | 709/223 |
| 5,764,882 A | * | 6/1998 | Shingo | 714/11 |
| 5,790,850 A | * | 8/1998 | Natu | 709/222 |
| 6,009,521 A | * | 12/1999 | Huang | 713/1 |
| 6,058,475 A | * | 5/2000 | McDonald et al. | 713/2 |
| 6,101,617 A | * | 8/2000 | Burckhartt et al. | 714/23 |
| 6,173,417 B1 | * | 1/2001 | Merrill | 370/216 |
| 6,233,680 B1 | * | 5/2001 | Bossen et al. | 713/1 |
| 6,275,931 B1 | * | 8/2001 | Narayanaswamy et al. | 711/4 |
| 6,275,953 B1 | * | 8/2001 | Vahalia et al. | 714/11 |
| 6,314,516 B1 | * | 11/2001 | Cagle et al. | 713/1 |
| 6,360,333 B1 | * | 3/2002 | Jansen et al. | 709/202 |
| 6,393,586 B1 | * | 5/2002 | Sloan et al. | 713/1 |

* cited by examiner

Primary Examiner—Ramesh Patel
(74) Attorney, Agent, or Firm—Trop, Pruner & Hu, P.C.

(57) ABSTRACT

A processor-based system performs automatic reboot for some initialization failures. The processor-based system runs an operating system. When initialization failures occur, the operating system may reboot the processor-based system and control the direction of a power-on routine. The power-on routine may send a page to a remote processor-based system, enter an emergency mode of operation, update system software, or perform other operations.

19 Claims, 5 Drawing Sheets

POWER-ON SOFTWARE FOR ROBUST BOOT

BACKGROUND

This invention relates to server systems and, more particularly, to successful initialization of servers.

A headless server is a server system which includes no keyboard, no mouse and no monitor. As expected, headless server systems typically operate without any human intervention. Because of this, headless server systems have higher reliability requirements than most other computer systems. Further, headless server systems ideally operate using minimal or no manual steps.

For a typical computer system, the "boot" process is executed by a program, usually located in read-only memory (ROM) of the computer system. The ROM program may be described as including two separate processes: the power-on self test, or POST, and the basic input/output system, or BIOS. The POST part of the program executes commands such that different circuitry and components of the computer system may be initialized. The BIOS portion includes functions which may be used by software, including POST, for communicating with different devices in the computer system.

Upon receiving power to the computer system, the POST program in the ROM immediately begins execution. The POST performs initialization functions, such as detecting and testing the memory, the display, the non-volatile media, such as hard disk and floppy disk drives, and so on. In some systems, an abbreviated POST, or "quick-boot," may be available.

Once the POST routine completes initialization and testing of the system, control is typically transferred to an operating system, usually located on the hard disk drive. Once the operating system gains control of the system, all run-time operations of the system, including any execution of application programs, are controlled by the operating system. The operating system may or may not utilize the BIOS functions in communicating with the hardware of the computer system.

Currently, boot processes are designed for systems with a monitor, a keyboard and a mouse. These processes assume that the user is present in front of the system, and may thus be available to respond to any POST or operating system errors. These errors may take the form of beeps, screen displays, or other indicia. Typically, execution of either the POST or operating system program will stop once these errors occur. Manual intervention is generally the only way for the boot process to proceed. Contingencies, such as automatic attempts to boot from other devices, are typically not executed by the POST or operating system programs. Further, information is typically not shared between the operating system and the POST routine.

Thus, there is a continuing need for a reliable and automated initialization process which may be assisted remotely.

DETAILED DESCRIPTION

In the various embodiments described below, a processor-based system may automatically procure the assistance of a second processor-based system in order to resolve an initialization failure of the system. The processor-based system may enter a console redirection, or emergency mode, for this purpose. Once the system is in the emergency mode, state and configuration information are provided to the remote console, and a mechanism for receiving and interpreting commands from the remote console is established. To the extent possible, the remote console may direct the system to execute a power-on or operating system routine, to power down, or to perform other remedial actions.

Figure 1:
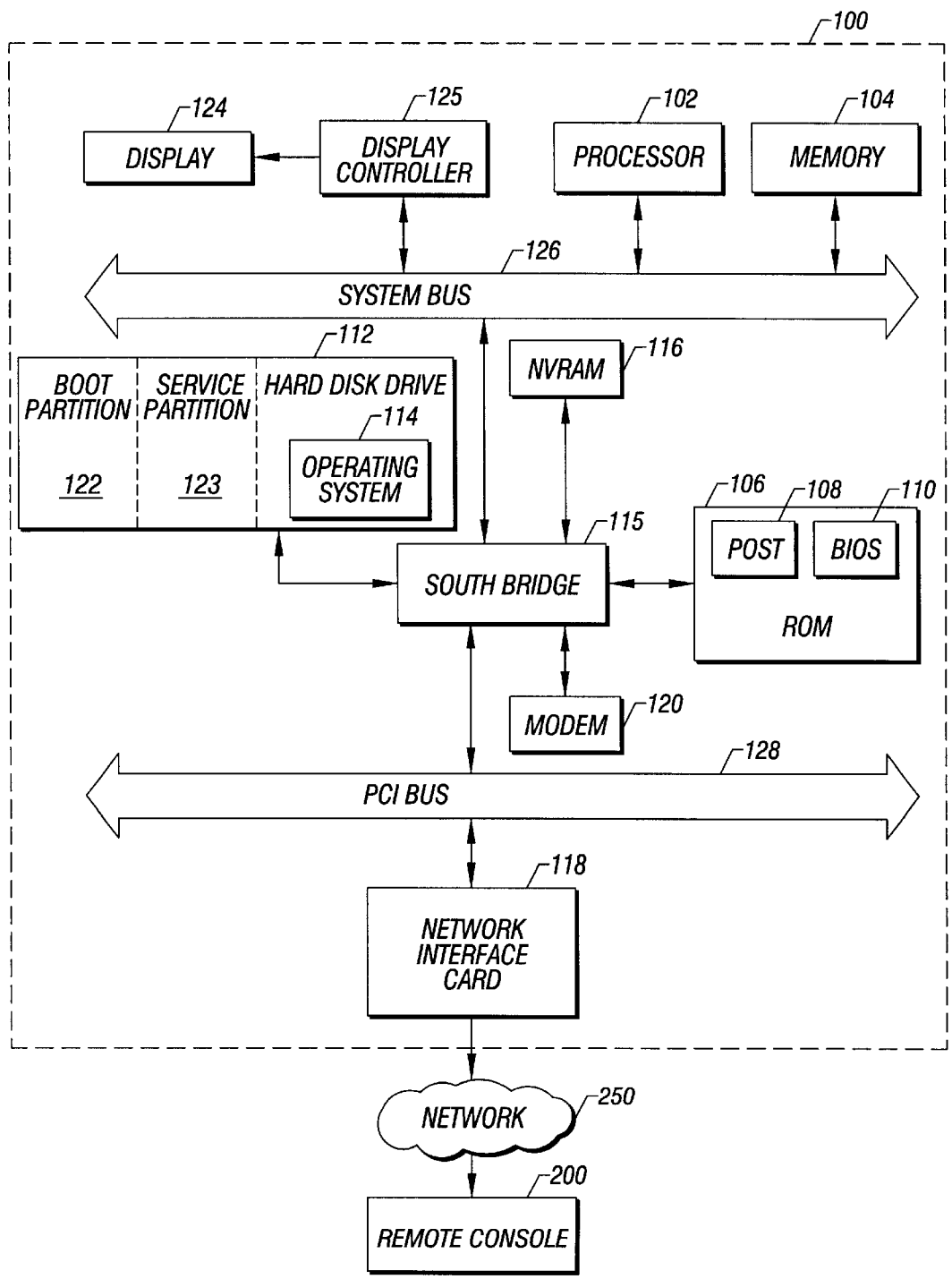
FIG. 1 is a block diagrams of the system according to one embodiment of the invention.

In FIG. 1, a computer system 100 includes a processor 102 and a memory 104, connected by a system bus 126. The processor 102 may generally refer to one or more central processing units (CPUs), microcontrollers or microprocessors, such as an X86 microprocessor, a Pentium® microprocessor or an advanced risk controller (ARM), as just a few examples.

Furthermore, the phrase "computer system" may refer to any type of processor-based system that may include a desktop computer, a laptop computer, a headless server, an appliance or a set-top box, as just a few examples. Thus, the invention is not intended to be limited to the illustrated system 100, but rather, the system 100 is an example of one of many embodiments of the invention.

The memory 104 may be one of a number of types of random access memories, such as dynamic random access memories (DRAMs), synchronous DRAMs (SDRAMs), and static RAMs (SRAMs). Other types of memory 104 may include single in-line memory modules (SIMMs) or double in-line memory modules (DIMMs).

The system bus 126 is further coupled to a display controller 125, which supports a display or monitor 124. For a headless server computer system, a monitor may not be present. However, in some embodiments, the headless server may include a small display, such as a small liquid crystal display (LCD), for error reporting.

The computer system 100 further includes a South Bridge 115, between the system bus 126 and a second bus 128. The South Bridge 115 is an input/output (I/O) controller which includes bridge support between the buses 126 and 128, as well as providing an interface to a hard disk drive 112, a modem 120, non-volatile read-only memory (NVRAM) 116, and read-only memory (ROM) 106.

In one embodiment, the bus 128 is a Peripheral Component Interconnect (PCI) bus 128. The PCI bus is compliant with the PCI Local Bus Specification, Revision 2.2 (Jun. 8, 1998, available from the PCI Special Interest Group, Portland, Oreg. 97214).

Among other circuitry not shown, the PCI bus 128 may support a network interface card 118, for high-speed connection of the computer system 100 to a network 250, such as a local area network (LAN) or a wide-area network (WAN). Alternatively, connection to the computer network 250 may employ the modem 120. In one embodiment, the modem 120 is a high-speed PCI modem, connected directly to the PCI bus 128.

Also connected to the network 250 is a computer system 200, such as a server system. The computer system 200 may act as a remote console to the computer system 100. For example, in some embodiments, the computer system 200 performs remote operations which assist in the successful boot of the computer system 100.

Looking back to the computer system 100, in one embodiment, the ROM 106 includes a power-on self test (POST) 108 program, and a basic input/output system (BIOS) 110 program. Alternatively, the POST 108 and BIOS 110 programs may reside in a flash memory device. The ROM 106 may also include non-volatile memory devices such as erasable and programmable read-only memories (EPROMs), electrically erasable and programmable read-only memories (EEPROMs), and flash memories.

In one embodiment, the hard disk drive 112 includes a boot partition 122. The boot partition 122 is a portion of the hard disk drive 112 which is dedicated to storing code for performing initialization operations. As a safety feature, the contents of the boot partition 122 are not typically affected when accesses to the hard disk drive 112, even including a drive format, occur. The hard disk drive 112 may include one or more boot partitions 122.

The hard disk drive 112 further may store an operating system 114. A portion of the operating system 114 may reside in the boot partition 122, as an additional protection against removal of the operating system 114. The operating system 114 may be loaded into the memory 104, for faster execution.

In one embodiment, the hard disk drive 112 includes a service partition 123. The service partition 123 may be "hidden;" that is, unavailable to the operating system 114 or other software. The service partition 123 may provide additional features which may assist in successful operation of the computer system 100. For example, in one embodiment, the service partition 123 may store updated BIOS functions, for performing an upgrade to the BIOS 110.

Because the NVRAM of the computer system 100 is non-volatile, the NVRAM 116 is particularly well-suited for storing information about the system, or "state" information, gathered during execution of the POST routine and the loading of the operating system 114. Alternatively, the state information may be saved to a complementary metal oxide semiconductor (CMOS) memory or other non-volatile media.

In one embodiment of the invention, the computer system 100 may enter an emergency mode state, such that the remote computer system 200 may retrieve information about the computer system 100, analyze the information, and perform operations to the computer system 100 such that the system 100 may become operational automatically. Such a feature may be beneficial for headless server systems, systems which are inconveniently located, and other processor-based systems which are practically inaccessible.

In one embodiment, the computer system 100 includes a common storage area, such as in the NVRAM 116, where configuration parameters, state information, and action parameters may be stored. The NVRAM 116 is "common" because it may be accessed by the POST program 108, the operating system software 114, and, as will be shown, below, by the remote computer system 200.

Figure 2:
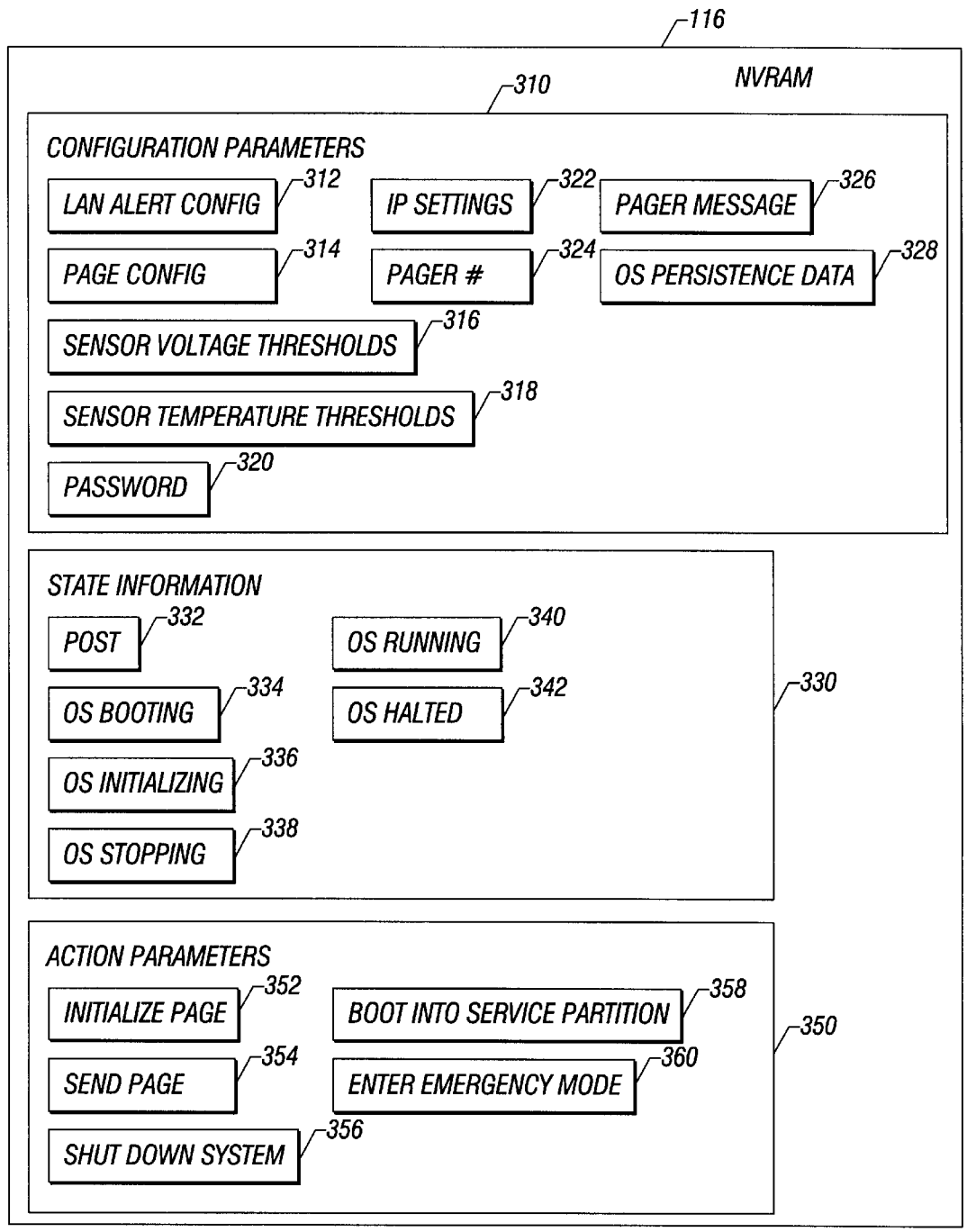
FIG. 2 is a block diagram of the NVRAM according to one embodiment of the invention.

In FIG. 2, the NVRAM 116 includes a plurality of configuration parameters 310. The configuration parameters 310 may include various configuration information relevant to a successful boot of the computer system 100. For example, in one embodiment, the system 100 monitors the voltage and the temperature of various sensors placed throughout the system. Accordingly, the configuration parameters 310 include sensor voltage thresholds 316 and sensor temperature thresholds 318 for each sensor of the system 100. Software, such as the POST program 108, may use these voltage and temperature ranges during the power-on of the system 100 or in diagnosing problems with the computer system 100.

Other examples of configuration parameters 310 include pager configuration 314, pager number 324, and pager message 326. As described below, upon realizing a failure to properly execute the POST program 108 or the operating system 114, the computer system 100 may initiate a page to the remote system 200. Accordingly, the configuration parameters 310 for providing this feature may be stored in the NVRAM 116.

In some embodiments, the computer system 100 further provides the capability to invoke a "LAN alert" to systems on the network 250. The LAN alert configuration 312 and internet protocol (IP) settings 322 supply the system 100 with information for supporting this feature.

In one embodiment, the configuration parameters 310 further include operating system persistence data 328. The operating system persistence data 328 may include information such as the number of attempted boots of an operating system, the number of boot partitions 122 on the computer system 100, the last failed boot partition, and so on, as examples.

In FIG. 2, the configuration parameters 310 further include a password 320. In some embodiments, the computer system 100 uses the password 320 to restrict access to the computer system 100, such as its operating during the emergency mode.

The NVRAM 116 may include additional configuration parameters 310 as desired. The configuration parameters 310 thus supply information about the configuration of the computer system 100 which may be relevant to the successful booting of the computer system 100.

In one embodiment, the NVRAM 116 further stores state information 330, comprising a number of different states of the computer system 100. By supplying a "snapshot" of the state of the computer system 100, the state information 330 may help to diagnose problems with the computer system 100.

In one embodiment, the state information 330 includes a POST state 332, as well as six operating system states: booting 334, initializing 336, stopping 338, running 340, and halted 342. Only one state is active at any time in the operation of the computer system 100.

For example, the POST state 332 indicates that execution of the POST program 108 is proceeding. The OS booting state 334 is set by the POST program 108 prior to jumping to the boot loader of the operating system 114. Thus, in one embodiment, the OS booting state 334 indicates that the POST program 108 has given up control of the system 100. The OS initializing state 336, by contrast, may indicate that the operating system 114 has received control from the POST program 108.

The OS running state 340, in one embodiment, indicates that the operating system 114 has successfully loaded and is running. The OS stopping state 338 indicates that the operating system 114 is about to begin an orderly shutdown, such as following a user request. The OS halted state 342 indicates that the operating system 114 has stopped operating. In the OS halted state 342, the state information 330 may further include information about why the operating system 114 stopped running.

In some embodiments, the NVRAM 116 further includes the action parameters 350. The action parameters include functions which allow notification of an error condition with the computer system 100, shutting down the computer system 100, and booting into the service partition 123, as examples. In one embodiment, the action parameters are implemented as a plurality of BIOS functions, which may be called by either the POST program 108 or the operating system software 114.

The action parameters 350 of FIG. 2 include functions for initializing the paging feature (function 352) and for sending a page to the remote system 200 (function 354). The initialize page function 352 may, for example, retrieve the page configuration parameter 314, the pager number 324 and the pager message 326 from the NVRAM 116. The send page function 354 may set up the modem 120, dial a pager number, and send a numeric message, based upon the information supplied by the initialize page function 352.

Functions for the orderly shut-down of the computer system 100 (function 356) as well as for booting into the service partition 123 (function 358) are also provided in some embodiments. The service partition function 358, in one embodiment, may be initiated to perform a BIOS upgrade. In one embodiment, the service partition 123 is a hidden partition of the hard disk drive 112. When an update to the BIOS 110 is desired, the replacement code may be stored in the service partition 123. By invoking the service partition function 358, the replacement code may be uploaded and programmed into the ROM 106.

The action parameters 350 further include a function for entering an emergency mode (function 360). The emergency mode function 360 permits the computer system 100 to retreat to the emergency mode state, such that the remote computer 200 may assist in resolving critical errors. The emergency mode is discussed in greater detail, below.

In one embodiment, the action parameters 350 are controlled by a BIOS control byte. The BIOS control byte may be set by either the POST program 108 or the operating system program 114, as needed. The BIOS control byte contains a unique value for each of the action parameters 350 of FIG. 2.

Figure 3:
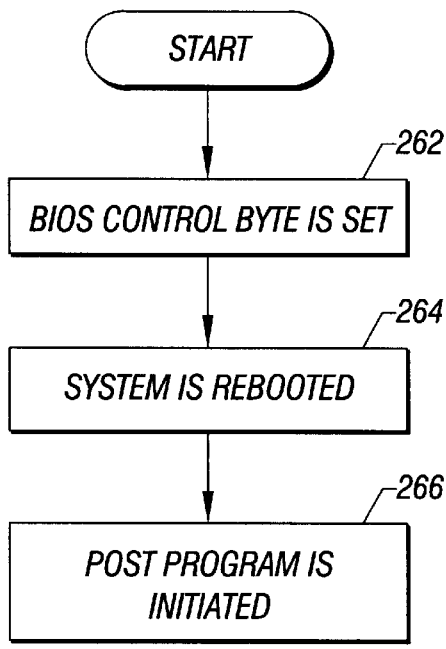
FIG. 3 is a flow diagram illustrating the operation of the BIOS control byte according to one embodiment of the invention.

In one embodiment, either the POST program 108 or the operating system 114 may set the BIOS control byte. Following any update to the BIOS control byte, the system 100 is rebooted and the POST program 108 is initiated once again. This embodiment is illustrated in FIG. 3.

At some point, either the POST program 108 or the operating system program 114 sets the BIOS control byte (block 262). Once the BIOS control byte is set, the system 100 is rebooted (block 264). Upon rebooting the system 100, the POST program 108 is re-executed (block 266).

Figure 4:
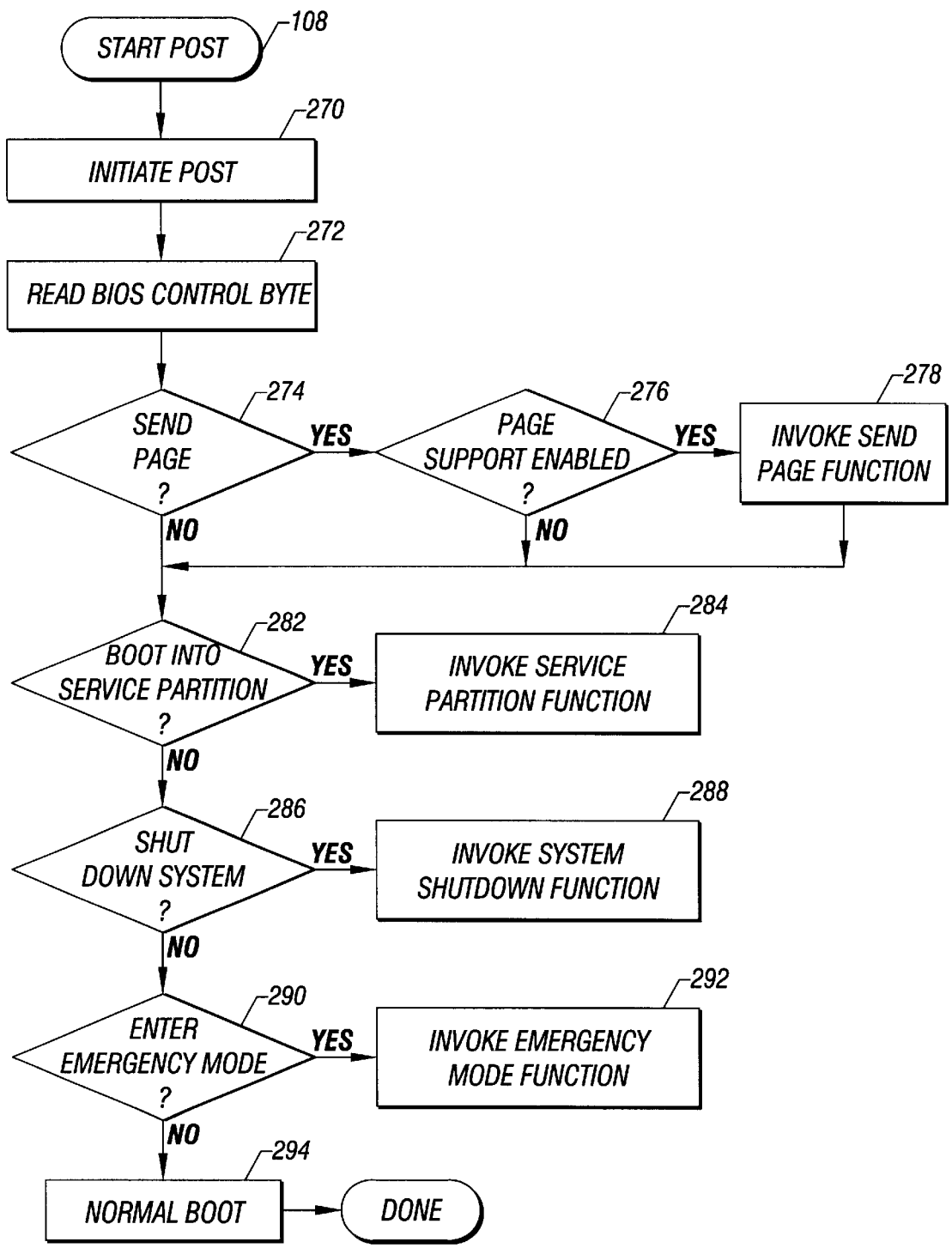
FIG. 4 is a flow diagram illustrating the fail safe BIOS extensions according to one embodiment of the invention.

The BIOS control byte, in essence, directs the POST program 108 to take one of several possible execution paths, according to one embodiment. Thus, as shown in FIG. 4, the POST routine is initiated (block 270), such as following a reboot of the system 100 (see block 266 of FIG. 3).

At some point during the execution of the POST program 108, the BIOS control byte is read (block 272). If the BIOS control byte was set in order to send a page (diamond 274), then the POST program 108 determines whether page support is enabled (diamond 276). If not, the POST program 108 continues its analysis of the BIOS control byte 272.

If page support is enabled, however, the send page function is invoked (block 278). In one embodiment, the send page function 354 obtains control of the modem 120 for paging the remote console 200 and retrieves the page configuration 314, the pager number 324, and the pager message 326 from the NVRAM 116. The send page function 354 then dials the pager number 324 and the numeric message 326. Once the page has been sent, the send page function 354 returns to the POST program 108.

Alternatively, the BIOS control byte may have been sent in order to boot into the service partition (diamond 282). In that case, the service partition function 358 is executed (block 284). The service partition function 358 may be implemented to upgrade a POST program 108 or BIOS function 110, for example.

The BIOS control byte may have been set by the POST program 108 or the operating system 114 programs in order to shut down the system (diamond 286). In that case, the system shut down function 356 is executed (block 288). In one embodiment, at the end of the system shut down function 356, power to the computer system 100 is removed.

Finally, in the embodiment of FIG. 4, the BIOS control byte may have been set in order to invoke the emergency mode 360 (diamond 290). If so, the emergency mode 360 of the computer system 100 is initiated (block 292). Otherwise, the POST program 108 proceeds with a normal boot (block 294).

In one embodiment, the emergency mode action 360 may be initiated by the remote system 200. However, the POST program 108 and the operating system 114 may repeatedly attempt to successfully initialize prior to invoking the emergency mode state. For example, in some embodiments, the hard disk drive 112 includes multiple boot partitions 122, each of which stores a separate operating system program 114. Further, multiple boot attempts, for each copy of the operating system 114, are performed. Thus, the POST program 108 may initiate multiple operating system boot attempts, on multiple partitions 122, prior to seeking assistance from the remote console 200.

When the computer system 100 is unable to boot an operating system 114, such as when the hard disk drive 112 is bad, the POST program 108 enters the emergency mode by invoking the emergency mode function 360. While in the emergency mode, the computer system 100 may establish a connection to the remote computer system 200, as well as sending information to and receiving directives from the remote system 200.

Figure 5:
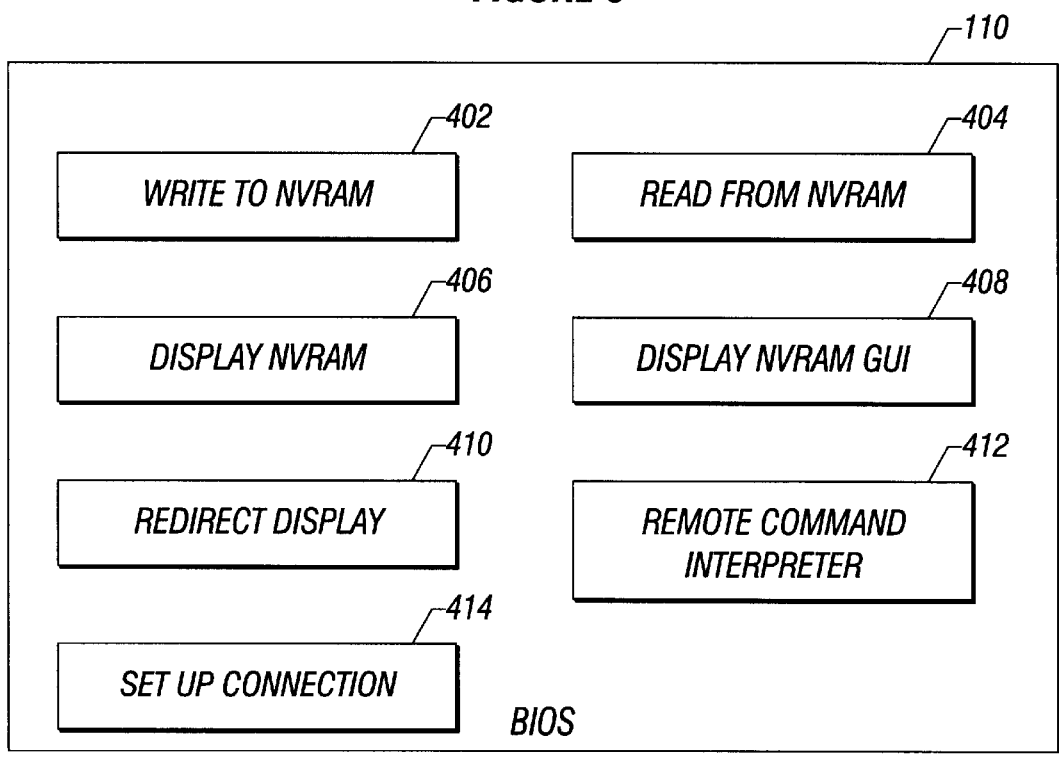
FIG. 5 is a block diagram of some BIOS functions used during the emergency mode according to one embodiment of the invention.

In one embodiment, the BIOS 110 includes functions used in the emergency mode. For example, as shown in FIG. 5, a BIOS function (function 414) may be used to set up a connection between the computer system 100 and the remote console 200. Another function (function 412) may act as a command interpreter. The command interpreter function 412 may receive commands from the remote console 200. The command interpreter function 412 further may determine particular actions, such as supplied by the action parameters 350 of the NVRAM 116 (see FIG. 2), to take in response to the command received.

A function for displaying the contents of the NVRAM 116 (function 406) may send state and configuration information to the display 124. Another function (function 410) may redirect command sequences intended for the display 124 such that the commands are instead received by the remote system 200. Using these functions 406 and 410, the contents of NVRAM 116 may be sent to the remote console 200 and sent to the display 224 for viewing.

Using these BIOS functions, the computer system 100, while in the emergency mode, may supply information to the remote console 200, such that the console 200 may assist the computer system 100.

Figure 6:
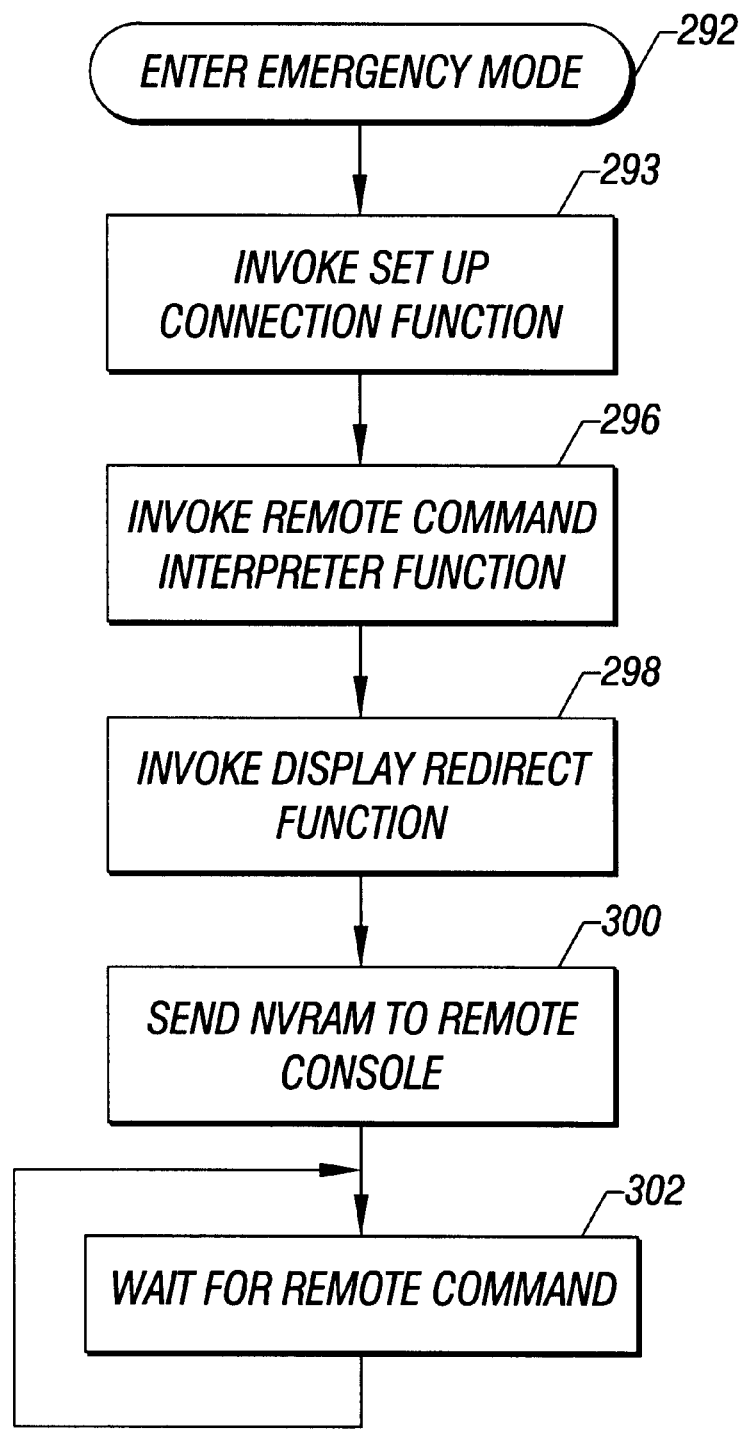
FIG. 6 is a flow diagram of the emergency mode of the system according to one embodiment of the invention.

In FIG. 6, the emergency mode function 360, implemented according to one embodiment, includes setting up a connection to the remote computer 200 (block 293). The connection may be established across the network 250, using the NICs 118 and 218, or may be established between the modems 120 and 220 using a phone line, as examples. A command interpreter is then loaded (block 296), such as the remote command interpreter 412 BIOS function.

While in the emergency mode, the remote console 200 may retrieve the contents of the NVRAM 116 from the computer system 100. In one embodiment, the command interpreter function 412 receives a request from the remote console 200 and invokes the display NVRAM function 406.

The display NVRAM function 406, however, sends the NVRAM 116 information to its own display controller 125, to ultimately be received by the display 124. However, the computer system 100 may include no display 124. Further, while in the emergency mode, the NVRAM 116 information may more effectively be received by the remote console 200.

Accordingly, the redirect display function 410 may be invoked (block 298). The redirect display function 410 intercepts signals intended for the display 124, such as to a video graphics array (VGA) monitor, and redirects the information through the existing remote console connection.

The NVRAM 116 may then be sent to the remote console 200 (block 300). In some embodiments, the NVRAM 116 may be displayed on the remote console 200 as a graphical user interface (GUI). The computer system 100 may then wait for a command from the remote system 200 (block 302). The command interpreter function 412 may interpret any incoming directives from the remote system 200.

Thus, in some embodiments, a processor-based system for automatically booting a headless system includes the ability to seek assistance when initialization fails. In some embodiments, the system may enter a mode which enables a second processor-based system to automatically take actions to restore the system to a working state. The system includes the capability to send information relevant to the successful resolution of initialization problems to the second system, in some embodiments. To the extent possible, the second system may direct the system to execute a power-on or operating system routine, to power down, or to perform other remedial actions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:
   identifying an initialization failure on a processor-based system during execution of an operating system program;
   sending an indicator to a memory location in response to the initialization failure;
   initiating a power-on program to read the memory location; and
   executing a predetermined set of operations by the power-on program based upon the indicator.

2. The method of claim 1, executing a predetermined set of operations by the power-on program based upon the indicator further comprising:
   accessing a modem;
   dialing a pager number; and
   sending a message.

3. The method of claim 1, executing a predetermined set of operations by the power-on program based upon the indicator further comprising shutting down the processor-based system.

4. The method of claim 1, executing a predetermined set of operations by the power-on program based upon the indicator further comprising:
   sending the indicator to a second processor-based system; and
   receiving a command in response to the initialization failure from the second processor-based system.

5. The method of claim 1, executing a predetermined set of operations by the power-on program based upon the indicator further comprising:
   booting into a service partition; and
   retrieving a replacement program to upgrade a basic input output system program of the processor-based system.

6. The method of claim 1, executing a predetermined set of operations by the power-on program based upon the indicator further comprising:
   setting up a connection with a second processor-based system;
   invoking a command interpreter; and
   waiting for a remote command.

7. A system, comprising:
   a processor;
   a memory coupled to the processor; and
   a storage medium coupled to the processor including a software program that, upon execution:
      identifies an initialization failure on the system;
      sends an indicator to the memory in response to the initialization failure;
      initiates a power-on program to read the memory; and
      executes a predetermined set of operations by the power-on program based upon the indicator.

8. The system of claim 7, further comprising a non-volatile random access memory for storing configuration information, wherein the power-on program further:
   accesses a modem;
   dials a pager number stored in the non-volatile random access memory;
   sends a message; and
   returns to the software program.

9. The system of claim 7, wherein the power-on routine further shuts down the system.

10. The system of claim 7, further comprising:
    a hard disk drive coupled to the processor; and
    a service partition on the hard disk drive.

11. The system of claim 10, wherein the power-on program further:
    boots into the service partition; and
    retrieves a replacement program to upgrade a basic input output system program of the system.

12. The system of claim 7, further comprising a non-volatile random access memory for storing configuration information, wherein the power-on routine further:
    connects to a second processor-based system;
    sends configuration information from the non-volatile random access memory to the second processor-based system;

loads a command interpreter;

receives a command from the second processor-based system; and performs an operation to the system in response to the initialization failure.

13. An article comprising a medium storing software that causes a processor-based system to:

identify an initialization failure during execution of an operating system program;

send an indicator to a memory location in response to the initialization failure;

initiate a power-on program to read the memory location; and execute a predetermined set of operations by the power-on program based upon the indicator.

14. The article of claim 13, further storing software that causes a processor-based system to execute a predetermined set of operations by the power-on program based upon the indicator by:

access a modem;

dial a pager number; and send a message.

15. The article of claim 13, further storing software that causes a processor-based system to execute a predetermined set of operations by the power-on program based upon the indicator by shutting down the processor-based system.

16. The article of claim 13, further storing software that causes a processor-based system to execute a predetermined set of operations by the power-on program based upon the indicator by:

sending the indicator to a second processor-based system; and receiving a command in response to the initialization failure from the second processor-based system.

17. The article of claim 13, further storing software that causes a processor-based system to execute a predetermined set of operations by the power-on program based upon the indicator by:

booting into a service partition; and retrieving a replacement program to upgrade a basic input output system program of the processor-based system.

18. A method, comprising:

identifying an initialization failure on a first processor-based system;

sending an indicator of the initialization failure to a second processor-based system;

receiving a command from the second processor-based system; and performing an operation on the first processor-based system in response to the initialization failure.

19. The method of claim 18, sending an indicator of the initialization failure to a second processor-based system further comprising:

storing the indicator in a non-volatile random access memory of the first processor-based system; and sending the non-volatile random access memory to the second processor-based system.

* * * * *